US008104649B2

(12) United States Patent
Riney

(10) Patent No.: US 8,104,649 B2
(45) **Date of Patent: *Jan. 31, 2012**

(54) DEVICE FOR DISPENSING A HEATED LIQUID

(75) Inventor: John M. Riney, Buford, GA (US)

(73) Assignee: Nordson Corporation, Westlake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/916,680

(22) Filed: Nov. 1, 2010

(65) Prior Publication Data

US 2011/0042416 A1 Feb. 24, 2011

Related U.S. Application Data

(63) Continuation of application No. 12/408,990, filed on Mar. 23, 2009, now Pat. No. 7,823,752, which is a continuation of application No. 11/943,080, filed on Nov. 20, 2007, now abandoned, which is a continuation of application No. 10/975,227, filed on Oct. 28, 2004, now abandoned.

(51) Int. Cl.
*B67D 3/00* (2006.01)
*F16K 31/02* (2006.01)

(52) U.S. Cl. ..................... 222/504; 222/146.5; 222/559; 251/129.09; 251/62; 251/58

(58) Field of Classification Search ............... 222/146.5, 222/504, 506, 559, 404; 251/129.09, 238, 251/58, 31, 26, 62, 231
See application file for complete search history.

(56) References Cited

U.S. PATENT DOCUMENTS

| | | | |
|---|---|---|---|
| 3,143,131 | A | 8/1964 | Spencer |
| 3,266,520 | A | 8/1966 | McGuire et al. |
| 3,815,788 | A | 6/1974 | Reighard et al. |
| 4,338,965 | A | 7/1982 | Garnjost et al. |
| 4,886,013 | A | 12/1989 | Turner et al. |
| 5,375,738 | A | 12/1994 | Walsh et al. |
| 5,656,135 | A | 8/1997 | Baker |
| 5,894,860 | A | 4/1999 | Baldauf et al. |
| 6,499,629 | B1 | 12/2002 | Colangelo et al. |
| 6,669,057 | B2 | 12/2003 | Saidman et al. |
| 7,025,081 | B2 | 4/2006 | Colangelo et al. |

(Continued)

FOREIGN PATENT DOCUMENTS

| | | | |
|---|---|---|---|
| DE | 202005000656 | U1 | 4/2005 |
| EP | 1226876 | A1 | 7/2002 |

OTHER PUBLICATIONS

Nordson EFD LLC, BackPack(TM) Valve Actuator, Operating Manual, 2010.
Baumer HHS GMBH, Xmelt(R) HP-500, Brochure, undated.

(Continued)

*Primary Examiner* — Kevin P Shaver
*Assistant Examiner* — Stephanie E Williams
(74) *Attorney, Agent, or Firm* — Wood, Herron & Evans, L.L.P.

(57) ABSTRACT

A device for dispensing a heated liquid, such as a hot melt adhesive, which includes a dispenser body adapted to dispense the heated liquid, a solenoid valve, and a pneumatic section including a housing coupled between the solenoid valve and dispenser body. The pneumatic housing is formed from a thermally insulating material which may include a thermoplastic polymer such as polyphenylene sulfide (PPS) or a fluoroplastic polymer to reduce heat transfer from the dispenser body through the pneumatic housing thereby thermally insulating the solenoid valve.

14 Claims, 2 Drawing Sheets

U.S. PATENT DOCUMENTS

| | | | |
|---|---|---|---|
| 2003/0080153 A1 | 5/2003 | Saidman et al. |
| 2004/0011817 A1 | 1/2004 | Colangelo et al. |
| 2005/0236438 A1 | 10/2005 | Chastine et al. |
| 2008/0061080 A1 | 3/2008 | Riney |
| 2009/0026230 A1 | 1/2009 | Robinson et al. |
| 2009/0266844 A1 | 10/2009 | McGuffey |

OTHER PUBLICATIONS

Chinese Patent Office, Chinese Office Action in Application No. 2005101184732, issued Sep. 28, 2007, 12 pages.

U.S. Patent and Trademark Office, International Search Report and Written Opinion in PCT Application No. PCT/US10/049634, Nov. 4, 2010.

DEVICE FOR DISPENSING A HEATED LIQUID

CROSS-REFERENCE TO RELATED APPLICATIONS

This application is a continuation of U.S. patent application Ser. No. 12/408,990, filed Mar. 23, 2009 which is a continuation of U.S. patent application Ser. No. 11/943,080, filed Nov. 20, 2007 (abandoned), which is a continuation of U.S. patent application Ser. No. 10/975,227, filed Oct. 28, 2004 (abandoned), the disclosures of which are hereby incorporated by reference herein.

FIELD OF THE INVENTION

The present invention pertains generally to devices for dispensing a heated liquid and, more particularly, to a device for dispensing a heated liquid having a thermally insulated solenoid valve.

BACKGROUND OF THE INVENTION

A typical dispensing device for supplying a heated liquid, such as a hot melt adhesive, generally includes a heated dispenser body constructed from a heat transferable metal such as aluminum, brass, or stainless steel, and typically is coupled to a manifold, or other heater block, adapted to heat a liquid. The dispenser body includes a liquid inlet in fluid communication with the manifold to receive the heated liquid, and further includes a valve element that opens and closes a liquid outlet in communication with the inlet for dispensing discrete amounts of the heated liquid. The valve element is usually controlled by an actuating element, e.g. a piston, which generally is operated by an actuator, such as a solenoid valve, to control dispensing of the heated liquid through the liquid outlet.

Notably, the dispensing devices related to the present invention couple the solenoid valve adjacent the dispenser body while situating the actuating element thereabove in a vertical orientation. In addition, the housings enclosing the actuating element and the solenoid valve typically are composed of metal. As such, the close coupling arrangement, as well as the metal housings, permit unfavorable heat transfer from the dispenser body to the solenoid valve. This unfavorable heat transfer can lead to solenoid valve overheating and premature failure. Furthermore, due to the heat transfer within the dispensing device, an individual must protect their hands with heat resistant gloves when moving the heated device.

Accordingly, there is a need for an improved device for dispensing heated liquids, such as hot melt adhesives, which eliminates or reduces unfavorable heat transfer between the heated dispenser body and the solenoid valve.

SUMMARY OF THE INVENTION

A device of this invention includes a dispenser body having a liquid inlet which may be in fluid communication with a heated manifold to receive a heated liquid. The dispenser body further includes a liquid inlet, a liquid passage in communication with the liquid inlet, and a liquid outlet in communication with the liquid passage. The dispenser body also includes a valve element adapted to selectively allow and prevent flow of the heated liquid through the outlet from the liquid passage.

A housing is coupled to the housing and is further adapted to be coupled between a solenoid valve and the dispenser body. The housing includes an actuating element, e.g. a piston, operatively coupled to the valve element and operable by the solenoid valve to control dispensing of the heated liquid through the liquid outlet. The housing may be a pneumatic housing and may be formed from a plastic material to reduce heat transfer from the dispenser body through the pneumatic housing thereby thermally insulating the solenoid valve. This can extend the life of the solenoid valve and permit handling of the device without the need for heat resistant gloves.

Examples of plastic, thermally insulating materials include thermoplastic polymers, such as polyphenylene sulfide (PPS) or a fluoroplastic polymer, such as polytetrafluorethylene (PTFE), fluorinated ethylene propylene (FEP), ethylene/tetrafluorethylene copolymer (ETFE), and perfluoroalkoxy (PFA). In addition, the pneumatic housing and dispenser body may be arranged in a side-by-side manner such as with the solenoid valve situated in a position substantially opposite the dispenser body.

The features and various advantages of the present invention will become more readily apparent from the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain one or more embodiments of the invention.

DETAILED DESCRIPTION

Figure 1:
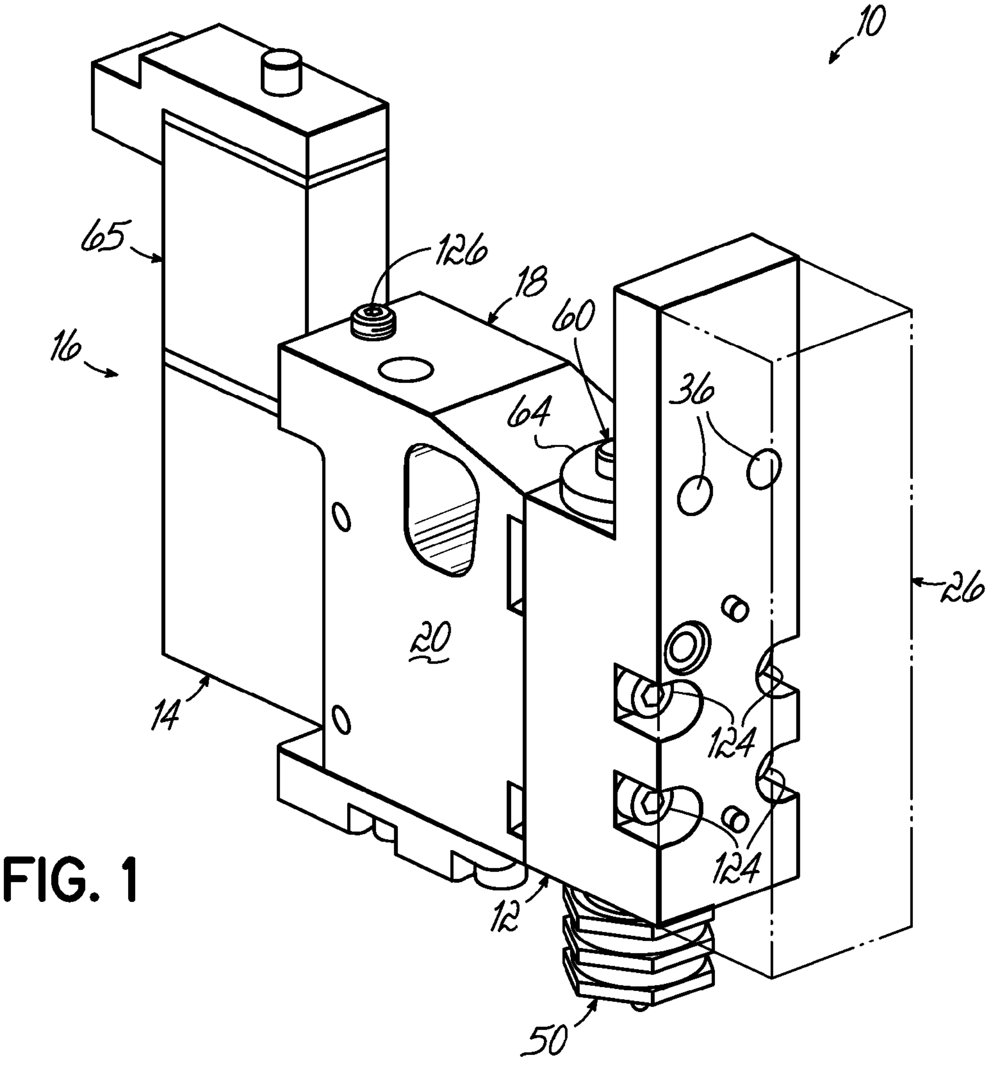
FIG. 1 illustrates a perspective view of an embodiment of the device for dispensing a heated liquid of the present invention.
Figure 2:
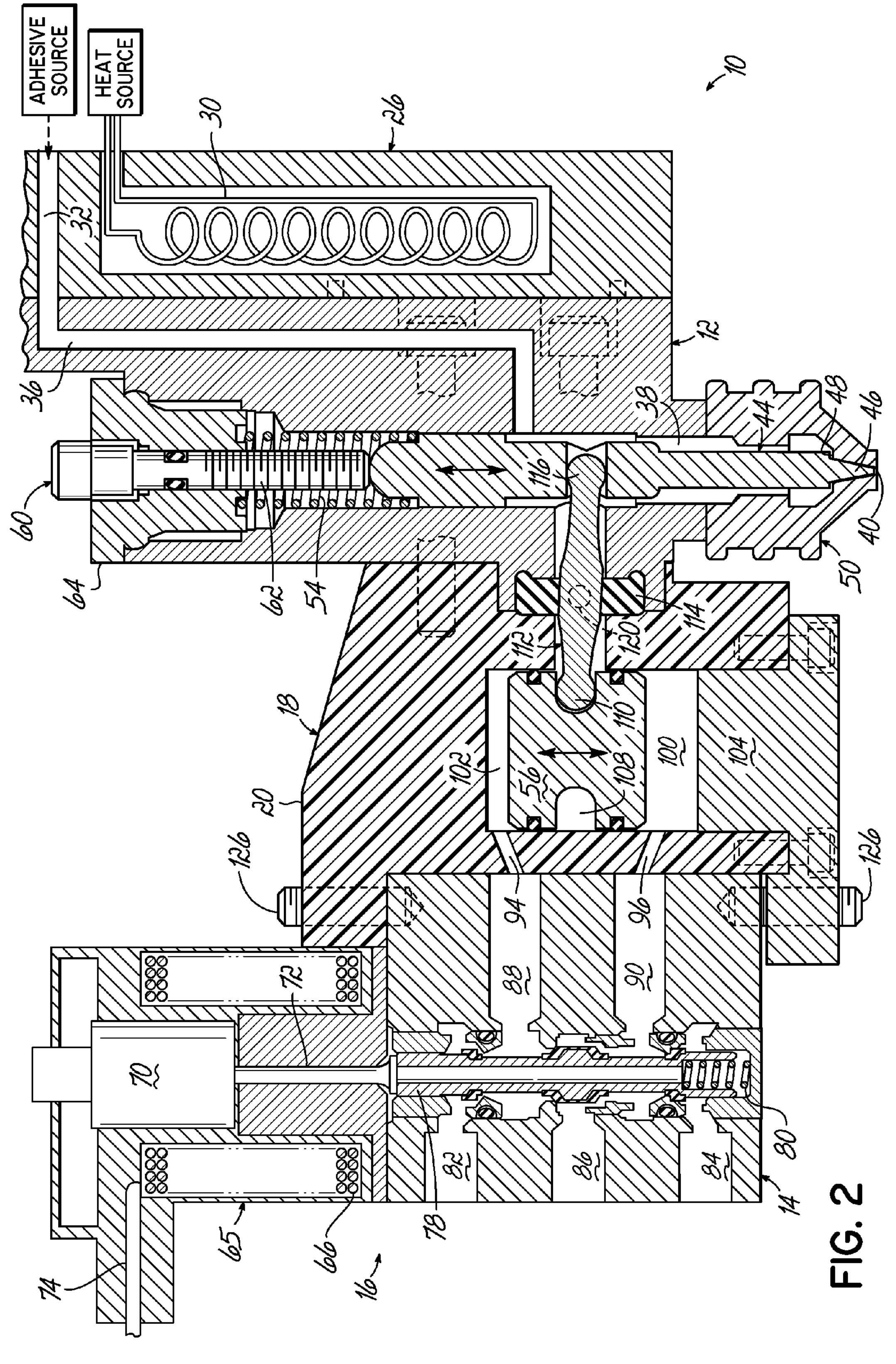
FIG. 2 illustrates a sectional view of the device of FIG. 1.

As shown in FIGS. 1 and 2, a device 10 for dispensing a heated liquid (not shown), such as a hot melt adhesive, generally includes a dispenser 12 body adapted to dispense the heated liquid, an actuator, i.e., a solenoid valve 16 with a housing 14, and a pneumatic section 18 having housing 20 coupled between the solenoid valve 16 and dispenser body 12 to reduce heat transfer from the dispenser body 12 through the pneumatic housing 20 thereby thermally insulating the solenoid valve 16. It is noted that one alternative to the device 10 of FIG. 1 could be an electrically actuated dispenser device instead of a pneumatically actuated dispenser device 10.

The dispenser body 12 is coupled by means, commonly known in the art, such as bolts or screws (not shown), to a manifold 26 that has a chamber (not shown) for holding a liquid, a heating element 30 adapted to heat the liquid, and an outlet port 32 in communication with the chamber. The operation of the manifold 26 is well understood by one of ordinary skill in this field and delivers the heated liquid under pressure to the dispenser body 12 via the outlet port 32. The dispenser body 12 is further provided with a liquid inlet 36 in fluid communication with the outlet port 32 to receive the heated liquid, a liquid passage 38 in communication with the liquid inlet 36, and an outlet 40 in communication with the liquid passage 38. The dispenser body 12 is adapted to be heated and is constructed from a heat transferable, non-interactive metal, such as aluminum, brass, stainless steel, or the like. A valve element 44 is situated within the dispenser body 12 and is adapted to selectively allow and prevent flow of the heated liquid from the passage 38 through the outlet 40.

As best shown in FIG. 2, the valve element 44 has a valve tip 46 configured to engage a valve seat 48 such that when the valve tip 46 is engaged therewith, no pressurized fluid can travel from the liquid passage 38 through the outlet 40 of the nozzle 50, i.e., fluid remains within the liquid passage 38. In the alternative, when the valve element 44 is disengaged from the valve seat 48, then pressurized fluid is dispensed through the outlet 40. A spring 54 is positioned to urge the valve element 44 downward such that movement of a piston 56, as further described below, is sufficient to overcome the force of the spring 54 and move the valve element 44 to dispense heated liquid through the outlet 40. FIG. 2 further optionally shows a needle stroke adjust mechanism 60 including a threaded rod 62 that passes through a cap 64. The rod 62 can be rotated clockwise or counterclockwise to adjust its distance from the top of the valve element 44 and control the amount of travel of the valve element 44.

It should be understood by one of ordinary skill that any number of alternative dispenser bodies 12 may be used. For example, dispenser bodies 12 may include integrally formed heater blocks and/or be integrally formed with a manifold, or other similar assembly. In addition, the term "valve element" is used herein in a generic sense and is intended to encompass a wide range of movable members having a variety of shapes and contours. For example, a ball and seat type valve arrangement (not shown) may be used to control dispensing of the heated liquid through the outlet 40.

With further reference to FIGS. 1 and 2, the operation of the solenoid valve 16 is well understood by one of ordinary skill in this field and performs so as to deliver pressurized air in a controlled manner to the piston 56 provided within the pneumatic housing 20. Since the preferred solenoid valve 16 is a commercially available product, the solenoid valve 16 operation is not described in great detail. However, its general operation is described below.

As indicated, the solenoid valve 16 is electronically controlled to either permit or prevent passage of the pressurized air to an actuating element, i.e. the piston 56, within the pneumatic section 18. More specifically, the solenoid valve 16 is provided with a solenoid 65 having a coil 66 and an armature, i.e. a body 70 and a shaft 72. Through an electric current supplied to the coil 66, via an electrical connector 74, an electrical field is created that moves the body 70 and shaft 72 up and down. The solenoid valve 16 further includes a spool, or poppet 78. The poppet 78 is pushed downward by the shaft 72 and a spring 80 urges the poppet 78 upwards against the force of the shaft 72. The valve housing 14 is provided with a first exhaust port 82, a second exhaust port 84, and an air inlet port 86. A first passageway 88 and a second passageway 90 communicate, respectively, with passages 94 and 96 of the pneumatic section 18.

A constant source of pressurized air is received at the air inlet port 86 and is directed to one of the passageways 88 or 90. The vertical position of the poppet 78 determines if passageway 88 or 90 is in communication with the air inlet port 86. For example, if the poppet 78 is positioned so that air is directed from the air inlet port 86 through the passageway 90, then it flows into passage 96 and into a cavity 100 below the piston 56. This airflow will force the piston 56 to move upward. As the piston 56 moves upward, air is forced from a cavity 102 through the passage 94. With the poppet 78 in this position, the air is able to exit the passage 94 into the passageway 88 and out the first exhaust port 82.

Conversely, if the air is directed from the inlet port 86 through the passageway 88, then it flows into passage 94 and into the cavity 102 above the piston 56. This airflow will force the piston 56 within the pneumatic housing 14 to move downward. Accordingly, air exits the cavity 100 via the passage 96 and enters the passageway 90. Because of the position of poppet 78, the air is able to escape from passageway 90 out the second exhaust port 84.

In this manner, the solenoid 16 and poppet 78 can be used to move the piston 56 up and down within the pneumatic section 18, which typically includes an open bottom that permits the piston 56 to be inserted therein. This bottom can be closed off with a plug 104 that may be threaded or otherwise connected to the pneumatic housing 20. By using pressurized air to move the piston 56 both up and down, a need is eliminated for a biasing member (not shown), e.g. a spring, common in other dispensing devices. Thus, movement of the piston 56 does not have to overcome the spring force and, therefore, less force (i.e., volume or pressure of air) is needed to move the piston 56. Furthermore, when air pressure changes, the opening and closing forces remain balanced.

The piston 56 advantageously includes a groove 108 extending around the center of its periphery in which one end 110 of a pivot arm 112 will engage. The pivot 112 arm extends through a flexible seal 114 into the liquid passage 38 of the dispenser body 12 with the other end 116 being operatively coupled to the valve element 44. The pivot arm 112 pivots around a pivot point 120 so that when one end 110, 116 moves downward the other end 110, 116 moves upward, and vice-versa. Thus, the valve element 44 moves up or down when the end 110, 116 moves up or down. The dispenser body 12 is shaped so as to create a cavity for the seal 114 to sit in. The seal 114 preferably is made from a resilient or flexible material such as, for example, an elastomeric material that is deformable so that the seal 114 is slightly compressed in the cavity area and provides a seal 114 therebetween when the pneumatic section 18 and the dispenser body 12 are coupled together.

Notably, the pneumatic housing 20 is coupled between the solenoid valve 16 and dispenser body 12. Advantageously, the pneumatic housing 20 and dispenser body 12 are arranged in a side-by-side manner with the solenoid valve 16 situated in a position substantially opposite the dispenser body 12. The dispenser body 12 and the pneumatic housing 20 can be coupled together by any variety of methods. For example, in FIG. 1, four bolts 124 are used to connect the pneumatic housing 20 and the dispenser body 12. One of ordinary skill also will recognize that the pneumatic housing 20 and the solenoid valve housing 14 are connected in a similar fashion by two set screws 126. It should be understood that coupling of the pneumatic housing 20 to the solenoid valve housing 14 and dispenser body 12 may be accomplished by a variety of methods as is well known in the art.

The pneumatic housing 20 is formed from a plastic, thermally insulating material which advantageously includes a thermoplastic polymer, more advantageously polyphenylene sulfide (PPS) or a fluoroplastic polymer, such as polytetrafluorethylene (PTFE), fluorinated ethylene propylene (FEP), ethylene/tetrafluorethylene copolymer (ETFE), and perfluoroalkoxy (PFA). A preferred polyphenylene sulfide for use as the plastic, thermally insulating material is Techtron® PPS available from Quadrant EPP of Reading, Pa.

The plastic, thermally insulating material reduces heat transfer from the dispenser body 12 through the pneumatic housing 20 thereby thermally insulating the solenoid valve 16. By way of example, in the exemplary arrangements as shown in FIGS. 1 and 2, thermal modeling revealed a temperature between the surfaces of the pneumatic housing 20 and dispenser body 12, during testing, to be approximately 350° F. while the temperature between the surfaces of the pneumatic housing 20 and solenoid valve housing 14 was approximately 100° F. This reduction or difference in temperature contrasts with conventional dispensing devices, or guns, where the solenoid valve 16 is exposed too much higher temperatures. Accordingly, the coupling of the thermally insulating pneumatic housing 20 between the solenoid valve 16 and the dispenser body 12 helps to prevent overheating and premature failure of the solenoid valve 16 thereby extending the life thereof.

Additionally, while the embodiment described above includes pneumatic section 18 and an actuator, i.e., the solenoid valve 16, that work together to move an actuating element, i.e., the piston 56, within the pneumatic housing 20 via pressurized air, the present invention is not limited in its use and application to only such pneumatic sections 18. For example, some dispensing devices 10 operate using an electromagnetic armature (not shown) in which an electromagnet directly engages or disengages the armature so as to control movement of the armature without the use of pressurized air. Alternatively, piezoelectric actuators (not shown) may be used with actions that resemble the up-and-down motion of the piston 56. The electrically actuatable piston may be coupled with a pivot arm similar to that described herein without departing from the scope of the present invention. As such, the electrical section (which replaces the pneumatic section) may be arranged in a side-to-side manner with the dispenser body 12 in order to provide the benefits and advantages described herein. The present invention also contemplates using dispenser bodies 12 that include additional air inlets commonly labeled "process air." Such air is separate from that of the pneumatic section 18 and can be used, as one of ordinary skill would appreciate, to adjust the manner in which liquid is dispensed from the liquid outlet 40.

While the present invention has been illustrated by a description of various preferred embodiments and while these embodiments has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

What is claimed is:

1. A device for dispensing a heated liquid, comprising:

a dispenser body adapted to be heated and including a liquid inlet, a liquid passage in communication with said liquid inlet, and an outlet in communication with said liquid passage, said dispenser body further including a valve element adapted to selectively allow and prevent flow of the heated liquid through said outlet from said liquid passage;

a pneumatic housing proximately coupled to said dispenser body and including an actuating element enclosed therein, said actuating element including a piston connected to said valve element; and a solenoid valve proximately coupled to said pneumatic housing with a portion of the solenoid valve extending within the pneumatic housing and such that said pneumatic housing is situated between said solenoid valve and said dispenser body, said piston operated by said solenoid valve to control dispensing of said heated liquid through said outlet.

2. The device of claim 1 wherein said pneumatic housing is directly attached to said dispenser body and said actuator in a side-by-side configuration so that said pneumatic housing is situated between said solenoid valve and said dispenser body.

3. The device of claim 1, wherein said pneumatic housing comprises a plastic, thermally insulating material to reduce heat transfer from said dispenser body through said pneumatic housing.

4. The device of claim 3 wherein said plastic, thermally insulating material includes a thermoplastic polymer.

5. The device of claim 4 wherein said thermoplastic polymer is polyphenylene sulfide (PPS).

6. The device of claim 4 wherein said thermoplastic polymer is a fluoroplastic polymer.

7. The device of claim 1, wherein said solenoid valve is thermally insulated from said dispenser body.

8. A device for dispensing a heated liquid, comprising:

a liquid dispensing portion including an inlet for receiving the liquid and an outlet for discharging the liquid, a valve member mounted for movement relative to said outlet between open and closed positions, and a liquid passage communicating between said inlet and said outlet;

an actuation portion with an air passageway and containing a pneumatic actuator operated by positively pressurized air flowing within said air passageway to move said valve member at least to the open position, said actuation portion including a housing containing said pneumatic actuator; and an electrically operated solenoid valve including an air inlet adapted to be coupled with a source of the positively pressurized air, and at least one air outlet communicating with said air inlet, said air outlet positioned within said housing and communicating with said air passageway to direct the positively pressurized air to the air passageway.

9. The device of claim 8, wherein said housing is formed from a thermally insulating, nonmetallic material.

10. The device of claim 8, wherein said electrically operated solenoid valve is thermally insulated from said liquid dispensing portion.

11. A device for dispensing a heated liquid, comprising:

a liquid dispensing portion including an inlet for receiving the liquid and an outlet for discharging the liquid, a valve member mounted for movement relative to said outlet between open and closed positions, and a liquid passage communicating between said inlet and said outlet;

an actuation portion with an air passageway and containing a pneumatic actuator operated by positively pressurized air flowing within said air passageway to move said valve member at least to the open position, said actuation portion including a housing formed from a thermally insulating, nonmetallic material and containing said pneumatic actuator; and an electrically operated solenoid coupled to said housing and operative to selectively control introduction of the positively pressurized air to the air passageway.

12. The device of claim 1, wherein said portion of said solenoid valve that extends within said pneumatic housing includes at least one air outlet for delivering pressurized air into said pneumatic housing.

13. The device of claim 1, wherein said pneumatic housing is formed from a thermally insulating, nonmetallic material.

14. The device of claim 9, wherein said housing comprises a plastic, thermally insulating material to reduce heat transfer from said liquid dispensing portion through said housing.

* * * * *